United States Patent [19]
Gilliam, Sr.

[11] 3,833,228
[45] Sept. 3, 1974

[54] STACKABLE SEALING MECHANISM

[75] Inventor: Howard E. Gilliam, Sr., North Ton Awanda, N.Y.

[73] Assignee: Chenprene, Inc., Beacon, N.Y.

[22] Filed: July 19, 1973

[21] Appl. No.: 380,903

[52] U.S. Cl. ............................... 277/205, 277/124
[51] Int. Cl. ............................................ F16j 15/32
[58] Field of Search ............ 277/205, 124, 123, 212

[56] References Cited
UNITED STATES PATENTS

| | | | |
|---|---|---|---|
| 917,690 | 4/1909 | Weese | 277/205 |
| 1,246,089 | 11/1917 | Greende | 277/124 |
| 2,665,151 | 1/1954 | Fisler et al. | 277/205 |
| 3,013,830 | 12/1961 | Milligan | 277/205 |
| 3,554,563 | 1/1971 | Schumacher | 277/124 |
| 3,586,341 | 6/1971 | Whittaker | 277/124 |

*Primary Examiner*—Louis R. Prince
*Assistant Examiner*—Robert I. Smith
*Attorney, Agent, or Firm*—Alan M. Abrams; Robert E. Sloat

[57] ABSTRACT

There is disclosed a sealing design which allows seal members to be stacked upon each other in a manner which substantially reduces leakage, reduces the friction which generally accompanies expansion of a seal ring when pressure is applied thereto and offers self-aligning and high-load bearing properties. The sealing member preferably comprises at least two or more stacked seal members having similar designs which allow the individual members of the sealing mechanism to interlock giving the aforementioned benefits and advantages.

8 Claims, 4 Drawing Figures

PATENTED SEP 3 1974 3,833,228

STACKABLE SEALING MECHANISM

BACKGROUND OF THE INVENTION

1. Field of the Art

The field of art to which this invention pertains is sealing mechanisms. More particularly, this invention relates to a sealing member which is designed so that it may interlock with other similar sealing members to form a sealing device which has stacked individual members.

2. Prior Art

The most revelant prior art resides in Patent Office classifications dealing with stackable V-type packing devices.

A plurality of V-type packings are generally stacked upon each other in order to accommodate various size openings for the stacked packings. A change in dimensions along the height of the packing for different applications makes these type packing devices quite practical since the distance between the top to the bottom of the overall packing height can easily be changed by merely adding additional V-type packing units on top of each other. Additionally, adaptors tightly sealed against the top and the bottom seals, can be attached to such packing to prevent leakage. They also can be used to alter packing height.

However, there are substantial disadvantages in using V-type packing designs. One of the primary disadvantages is the change in stacking height which occurs when a load is placed on the packing material in a direction generally parallel to the stacked direction of the individual seals. A second and equally significant disadvantage in the use of the V-type packing seals especially when used in a stacked configuration, is the change in the cross-section of the stacked seal upon application of load pressures or forces in a direction parallel to the stacked height. Accompanying the change in the seal width and internal dimensions of the packing is increased friction and heat, since the expansion of the V-type packing will cause decreased spacing between it and a moving member to which the V-type packing is sealing against.

Another disadvantage with the V-type packing rings is that in many instances they are not self-aligning to the extent that they can be stacked upon one another, without using some sort of guide means to hold them in place prior to or during their installation into a given piece of apparatus.

All of the above disadvantages are eliminated through the use of the interlocking stacked sealing seal claimed by me. In particular, the most substantial improvement over the prior art V-type packing rings is the elimination of deformation of my seals when working loads are placed on the stacked seals either in a direction parallel or normal to the stacking direction. The unique use of certain design features substantially eliminates the change in stacked height between the free state and the loaded or pressurized state on the seal. Additionally, when ring seals are used embodying my inventive concept, their diameters are substantially unchanged under working pressures or when loaded. Additionally, accompanying the above two advantages are a substantial reduction in friction when the seal is used against a moving piston such as in hydraulic applications, since when a loading force is placed on my stacked seal mechanism substantially no distortion occurs. Also my stacked interlocking seal mechanisms are substantially self-aligning and can be placed upon one another and snapped together without the use of any aligning tools or the need to hold the packing rings in a certain position upon installation.

All of the above mentioned advantages together with the unique design and construction of my seal render a substantial unobvious improvement over the art.

SUMMARY OF THE INVENTION

My invention can be briefly be summarized as an interlocking sealing mechanism having located at the upper most portion of each individual segment of the sealing mechanism, a dome, with shoulders attached to the dome and sloping in a downward direction from the dome, each of the above mentioned shoulders containing a channel of a semi-circular configuration. Each of the shoulders are themselves attached to side walls which again slope downward and in the direction away from the dome. Located at the bottom most portion of the described seal is a wedge-shaped cavity which contains shoulders which slope in an inward direction and upward towards the dome. Beads are placed on these shoulders which themselves are connected to a dome cavity which points in a downward direction.

The individual stacking seal members having the above described configuration can be interlocked through the top dome and upper shoulders of one of the members intimately contacting the domed shaped cavity and lower shoulder of seal member placed above it. By this method of design the interlocking seal members can support substantial loads in the direction of their stacking height with substantially no deformation in the stacking height direction or in a direction perpendicular thereto.

My invention can further be summarized as sealing ring members having a general ring-like configuration with a cross-section of one section of the ring having an overall general description as described above.

In a broad embodiment my invention relates to an interlocking seal comprising and described in relation to said seal as: A dome projection located at a top portion of the seal; upper shoulders attached to said dome projection and sloping in a downward direction from said dome; a channel located in each upper shoulder; side walls attached to said upper shoulders and extending in a downward direction from said shoulders; a wedge-shape cavity having an apex and lower shoulders, a dome cavity containing said apex; the lower shoulders of said cavity attached to said side walls and extending in an upward direction towards said dome; and a bead located on each of the latter shoulders.

A further embodiment of my invention relates to an interlocking stackable seal having a general ring-like construction, described in relation to an axis passing through a center of said ring as comprising: a dome projection located on a top portion of said seal; an upper-inner shoulder attached to said dome extending radially towards said axis and in a downward direction; an inner channel in said shoulder; an inner side wall attached to said shoulder and extending radially towards said axis and in a downward direction; an upper outer shoulder attached to said dome extending radially and away from said axis and in a downward direction; an outer channel in said outer shoulder; an outer side wall attached to said outer shoulder and extending radially away from said axis and in a downward direction; an outer channel in said outer shoulder; an inner cavity shoulder connected to first said upper-inner shoulder said cavity shoulder extending radially away from said axis and in an upward direction; an inner bead located on said inner cavity shoulder; an outer cavity shoulder connected to said upper-outer shoulder extending radially towards said axis and in an upward direction; an outer bead located on said outer cavity shoulder; a dome shaped cavity connected to said inner and outer cavity shoulders and positioned so that said cavity opens in a downward direction, is located below said first mentioned dome and between said side walls.

DETAILED DESCRIPTION OF THE DRAWING

My inventive concept is more particularly depicted in the four figures attached.

Figure 1:
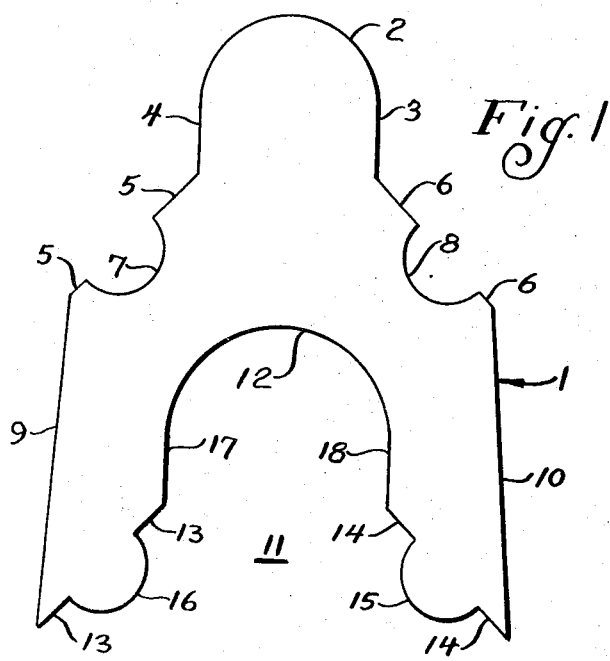

In FIG. 1 there is shown a detailed cross-sectional of one of the particular interlocking seal members which can be used as my invention.

Figure 2:
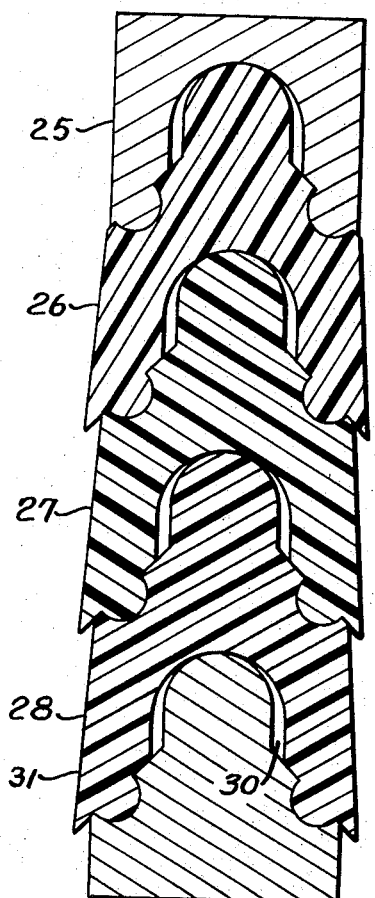

In FIG. 2 there is shown three of the interlocking sealing members stacked upon each other and located between upper and lower adaptor plates. Specifically, FIG. 2 shows the stackable sealing mechanism of my invention.

Figure 3:
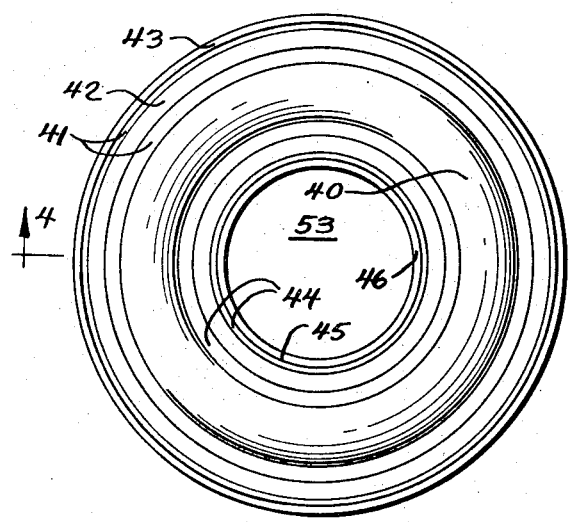

In FIG. 3 shows an overall view, looking downward, of a sealing ring constructed according to my invention.

Figure 4:
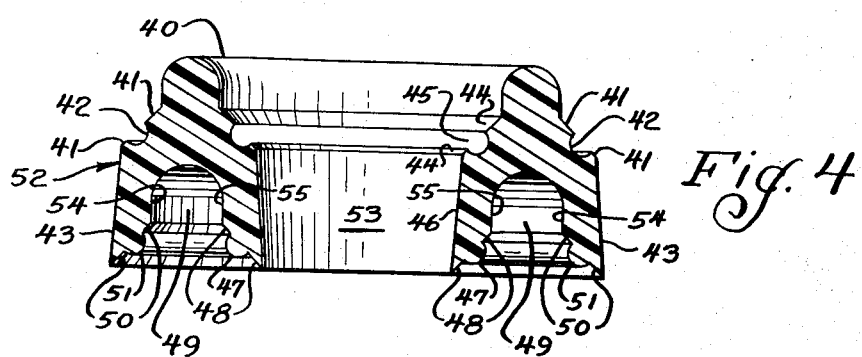

FIG. 4 is a cross-sectional in the vertical direction of sealing ring shown in FIG. 3.

More specifically, in FIG. 1, one of the interlocking sealable members 1 is shown. The sealing member is placed so that the dome projection 2 is located at a top portion of the overall structure. The dome 2 is shown as a spherical volume which in this instance is connected to upper shoulders 5 and 6 through side walls 4 and 3 respectively. The side walls 3 and 4 are not necessary elements of the invention but will be used where the dome 2 is required to be an extended height above the shoulders 5 and 6. Shoulders 5 and 6 slope in a downward and outward direction, with respect to dome 2. Located in each shoulder are channels 7 and 8. Preferably, the channels 7 and 8 are semi-circular void spaces but in many instances they may be V-shaped or square. The preference towards the circular shape for the channels 7 and 8 allows shoulders to bear more weight when loaded from above and also helps seal fluids to prevent their leakage through the seal at the points where the individual interlocking pieces mate.

Side walls 9 and 10 slope in a slightly outward direction and downward from the dome projection 2 and, as shown in FIG. 1, are directly attached to shoulders 5 and 6 respectively. The side walls are preferably straight but in many instances may contain slight curvatures or indentations depending upon the particular application of the sealing mechanism. Side walls 9 and 10 are themselves attached to lower shoulders 13 and 14 respectively. The lower shoulders pass in an upward direction and towards the dome projection 2. Located on each of the lower shoulders 13 and 14 are beads 16 and 15 respectively. The beads preferably are semi-circular but may be any other shape. The semi-circular shape of the beads is preferred since this shape will more readily fit into a similarly shaped channel located on the shoulders of the interlocking sealing device upon which the particular device in question is placed. The semi-circular shape also will distribute heavier loads.

The volume or cavity 11 is defined as a wedge-shaped volume located between the lower shoulders 13 and 14.

As shown in the drawing, the apex of the wedge volume 1 is located within a dome shaped cavity 12.

Preferably, the dome cavity 12 is connected through straight sections 17 and 18 directly to shoulders 13 and 14 respectively. The straight sections 17 and 18 may be eliminated if the straight sections 3 and 4 of the dome projection 2 are also eliminated.

FIG. 2 illustrates three of the interlocking seal members stacked and located between upper and lower adaptor plates, 25 and 29 respectively to form a seal.

Interlocking seal members 26, 27 and 28 have substantially identical dimensions so that when stacked the channels on the upper shoulder and the beads on the lower shoulders interlock forming a tight seal which will support extended load ranges in a vertical direction without changes in the overall dimensional length of the seals. Additionally, the interlocking of the beads and channels can prevent lateral expansion when the seals are loaded.

Upper adaptor plate and lower adaptor plate 29 are generally machined or molded out of materials such as thermoplastics, thermosetting plastics, elastomeric materials, bronze and/or aluminum or other machinable materials which can adapt a tight sealing of the interlocking seal to the apparatus upon which the seal is used. When the interlocking seals are ring like structures, the upper and lower adaptor plates are also ring like structures.

It is preferable that the seals be placed upon one another as shown in FIG. 2, however, they may be inverted so that they are stacked forming a Y-type configuration.

It is not necessary that three or more interlocking seals be utilized and in fact in some instances one of the interlocking seals can be utilized with a substantial increase in overall height as to take the place of the three individual interlocking seals as shown.

In other instances the interlocking seals may be straight. In such cases, side adaptor plates located in front of and behind the seals should be utilized so as to prevent leakage from their vertical faces. In such instances, well known prior art sealing mechanisms can be utilized.

In FIG. 2, is an optional cavity 30. This cavity will generally appear where the dome projection and the dome cavity are not identical in size. The shoulders, channels and beads which are in intimate contact are so designed that when working loads are applied or when the interlocking seals are snapped together they remain together and form an essentially impervious seal. This will prevent leakage under working conditions.

In FIG. 3, there is shown one of the interlocking sealing rings of my invention. Specifically, a view from above the sealing ring is shown with the dome projection 40 being located at the upper most portion of the projection in FIG. 3.

The outer side wall 43 and inner side wall 46 are shown as the inner and outer areas of the ring seal as shown in FIG. 3. Both the inner side wall and the outer side wall are connected to upper shoulders. Specifically, outer side wall 43 is connected to upper-outer shoulder 41. Inner side wall 46 is connected to inner upper-inner shoulder 44. Located within the upper-outer shoulder is channel 42 and located respectively within the inner-upper shoulder 44 is channel 45. Both channels 42 and 45 have substantially semi-circular cross-sectional areas as shown. They may take other shapes depending upon the particular design and operating conditions to which the seal will be used.

Both the inner and outer-upper shoulders 44 and 41 are connected respectively to the upper dome projection 40. As shown in FIG. 3, side walls, shoulders, channels and the dome projection are all concentric. This is the preferred method of construction of a sealing ring although in other instances an irregular non-circular shape may be utilized as long as the cross-section area of most of the sealing member substantially corresponds to that cross-sectional area as described in FIG. 1 above.

The horizontal cross-sectional view of the sealing ring of FIG. 3 is shown in FIG. 4.

Specifically, FIG. 4 shows a cross-section of a ring, the corresponding elements of which have already been described in FIG. 1.

Upper dome projection 40 is shown as being attached to upper-inner shoulder 44 and upper-outer shoulder 41. Contained within these shoulders is an inner channel 45 and an outer channel 42 respectively. Inside side wall 46 is connected to the upper-inner shoulder as is the outer side wall 43 which is connected to the upper-outer shoulder. Both the inner and outer side walls project in a downward direction and diverge as they proceed in that direction. Each of the inner and outer side walls are connected respectively to lower-inner shoulder 48 and lower-outer shoulder 50. Located on the lower-inner shoulder 48 is an inner bead 47 and located on the lower-outer shoulder 50 is bead 51. The inner and outer lower shoulders are connected respectively to the inner-straight section 55 and outer-straight section 54 respectively. The inner and outer straight sections themselves are connected to dome cavity 49. Preferably, the dome cavity is spherical and designed so that it will intimately mate with the dome projection from the other sealing ring which will be placed underneath the one described.

The volume contained within the inner and outer lower shoulders and dome cavity is generally referred as a wedge-shaped cavity volume.

DETAILED DESCRIPTION OF THE INVENTION

The interlocking seals of my invention can be formed into any desirable shape which in most instances will depend upon the use to which they are to be put. Particularly and in a preferred instance, the interlocking seals are generally in the form of rings which can be stacked upon one another and located between the adaptor plates. In another instance, the interlocking seals may be relatively straight and used in a stacked manner to perform their sealing duties.

The overall dimensions of the interlocking seals when in the shape of rings or other enclosed shapes can be anywhere from about a few inches or smaller in diameter to many feet or larger. When the interlocking seals are used as relatively straight or not totally enclosed shapes they can vary from a few inches to a few feet in width and height and from a few inches to a few feet in length.

In one instance in which an interlocking seal is utilized which is a continuous connected shape, it may be in the form of a rectangle although the problems associated with designing such a configuration present much more difficulty than when designing the interlocking seals as straight members or ring configurations.

To fabricate such a seal or interlocking seal many materials may be utilized. Specifically, the seals can be fabricated from elastomeric polymers, plastic materials, metals, etc. Specific examples include materials such as nitriles, neoprenes, polyurethanes, thermoplastics, thermosetting materials. It is possible to use reinforcing materials, such as fibers, cloth strands or even steel strands when using elastomeric or plastic materials. In one instance, a seal which is used in a hydraulic pressurized system can be fabricated from fabric reinforced elastomeric materials which is substantially resistant to oxidation and reaction with the hydraulic oil to be used. The particular material selected to construct the seal should provide that the leak proof, low friction, non-adjustable, self-aligning, low compression set features may be maintained so as to prevent the unwanted characteristics of other prior art seals from being manifested in the present invention.

The method of fabricating the above seals are not particularly critical and are assumed to be well known in the art. Such methods of fabricating seals include various molding operations in which interlocking seals are produced from a mold under pressure and heat where necessary.

The uppermost structure of the sealing mechanism contains a dome projection which preferably is a spherical or semicircular shape. The dome projection extends so that the curved portion points in a downward direction-that is, in a direction towards the wedge cavity located preferably in the lower section of the interlocking seal. The dome projection and the sides of it are in direct communication with the shoulders which are sloping and are preferably straight sections of the interlocking seal which again point in a downward direction and diverge as they extend in a downward direction from the dome projection. In some instances the dome projection itself contains straight sections when it is desired that the dome projection be substantially elevated above the shoulders. In these instances straight sections will connect the curved dome projection to the shoulder. In defining the invention in the claims these straight section shall be included as being part of the dome projection.

The upper shoulder as mentioned above, extend in a downward direction away from the dome projection and preferably diverge as they so extend. The upper shoulders are connected directly to side walls which themselves point in a downward direction and also diverge as they extend away from the dome. However, the side walls diverge to a lesser degree than the upper shoulders.

Located within both of the upper shoulders is a channel which channel is preferably a semi-circular groove cut out of the shoulder. The purpose of the channels in each of the upper shoulders is to allow an interlocking of these channels with the beads located on the lower shoulders of another interlocking seal which is placed on top of the seal being described. This allows an intimate contacting and an interlocking to occur between the two sealing mechanisms. The channels can be located anywhere along the individual shoulders and preferably are equal distant from the point where the dome projection meets the shoulders, for both of the channels. In this manner the interlocking seal mechanism can remain symmetrical.

The side wall as mentioned above are preferably straight having little, if any, irregularity in their surface and diverge as they extend in a downward direction and away from the dome projection. They are connected directly to the upper and lower shoulders.

The lower shoulders extend in a manner which in preferable instances shows them as being substantially parallel to a plane passing through the upper shoulders. Preferably, the lower shoulders are directly connected to the side walls and extend from these side walls upwards towards the dome projection and in a converging manner. The location of the lower shoulders can be shown in FIG. 1.

The lower shoulders themselves are connected to a dome cavity volume which is a void volume located between the side walls and below the dome projection of the interlocking seal. Preferably, the dome cavity has a shape which allows it to accept the dome projection on a sealing member located below the sealing member described. In some instances, where the dome projection itself is extended having straight sections, the dome cavity may also have straight sections which themselves are connected to the lower shoulders. The straight sections again can be included as being part of the dome cavity.

The entire volume which is described as the void space or cavity located between the lower shoulders and below the dome cavity is generally referred to as a wedge-shaped cavity since the lower shoulders and the imaginary plane connecting the points where the lower shoulders intersect or meet the side walls forms a wedge-shaped volume.

The upper shoulders in a preferable instance are angled in a downward direction approximately 45° from a vertical axis. The side walls which are connected to the upper shoulders and slope, as the shoulders do, away from the dome projection but to a far lesser degree. Preferably, the side walls are angled from a vertical axis anywhere from less than one to a few degrees or greater. The lower shoulders which are connected to the side walls point in an upward direction and intersect a vertical axis at about a 45° angle in a preferable instance. It can then be seen that planes drawn parallel to the upper shoulders will intersect at about 90° as will planes which are parallel to the lower shoulders. It is not, however, required that they intersect at such an angle. The overall construction with respect to the various angles of the shoulders and the side walls can be modified from that given above. It must be kept in mind that when varying the angular projection of the upper and lower shoulders from a vertical axis that they must be so designed that the upper shoulders of one of the interlocking seals will intimately contact the lower shoulders of another interlocking seal. In this manner the shoulders will form an interface which can support columnar loads upon the seal and also effectively prevent leakage through the contacting surfaces of the two shoulders. It is therefore required, in most instances, that the angles from the vertical of both the upper shoulders and the lower shoulders be substantially identical so as to allow their surfaces to be intimately and tightly in contact.

In referring to an interlocking stackable seal having a general ring-like construction I mean, a seal which is in the shape of a ring or any other type of a shape such as a rectangle in which the entire interlocking seal is a continuous structure. More preferably, the interlocking seal is a circular or ring-like figure.

When the interlocking seal is a ring, the inner components are generally referred to as those elements which are closer to the center axis of the ring-like structure than the outer elements. In particular, when the interlocking seal has a symmetrical construction the inner and outer components are mirror images of each other.

The above description is not presented to unduly limit the scope of attached claims. Various changes or modifications to the basic inventive concept, not specifically listed above, can take place without going beyond the claimed concept.

I claim as my Invention:

1. An interlocking seal comprising:
a dome projection located at a top portion of the seal; upper shoulders attached to said dome projection and sloping in a downward direction from said dome; a channel located in each upper shoulder; side walls attached to said upper shoulders and extending in a downward direction from said shoulders; a wedge-shape cavity having an apex and lower shoulders; a dome cavity containing said apex; the lower shoulders of said cavity attached to said side walls and extending in an upward direction toward said dome projection; and, a bead located on each lower shoulder.

2. Claim 1 in that said seal comprises material selected from the group consisting of elastomeric polymers, thermosetting plastic, thermoplastics and metals.

3. Claim 1 in that said dome projection is semicircular.

4. Claim 1 in that said channel in each upper shoulder comprises a trough having a semi-circular cross-sectional area.

5. Claim 1 in that each bead comprises a ridge projection having a semi-circular cross-sectional area.

6. Claim 1 in that said dome cavity is semicircular.

7. Claim 1 in that said upper and lower shoulders are flat surfaces.

8. An interlocking stackable seal having a general ring-like construction, described in relation to an axis passing through a center of said ring as comprising:
a dome projection located on a top portion of the seal; an inner-upper shoulder attached to said dome projection extending radially toward said axis and in a downward direction with respect to said dome; an inner channel in said inner-upper shoulder; an inner side wall attached to said inner-upper shoulder and extending radially toward said axis and in a downward direction with respect to said dome; an outer-upper shoulder attached to said dome extending radially away from said axis and in a downward direction with respect to said dome; an outer channel in said outer-upper shoulder; an outer side wall attached to said outer-upper shoulder and extending radially away from said axis and in a downward direction with respect to said dome; a wedge-shape cavity located between said side walls and below said dome; an inner-lower cavity shoulder connected to said inner side wall, said inner-lower cavity shoulder extending radially away from said axis and in an upward direction with respect to said dome; an inner bead located on said inner-lower cavity shoulder; an outer-lower cavity shoulder connected to said outer side wall extending radially toward said axis and in an upward direction with respect to said dome; an outer bead located on said outer-lower cavity shoulder; a dome shaped cavity located in said wedge-shape cavity, connected to said inner and outer-lower cavity shoulders and positioned so that said dome cavity opens in a downward direction with respect to said dome projection.

* * * * *